(12) United States Patent
Zhang et al.

(10) Patent No.: US 10,990,438 B2
(45) Date of Patent: Apr. 27, 2021

(54) METHOD AND APPARATUS FOR MANAGING EFFECTIVENESS OF INFORMATION PROCESSING TASK

(71) Applicant: FUJITSU LIMITED, Kawasaki (JP)

(72) Inventors: Shenbin Zhang, Beijing (CN); Bingfeng Pi, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 16/397,553

(22) Filed: Apr. 29, 2019

(65) Prior Publication Data

US 2020/0026552 A1    Jan. 23, 2020

(30) Foreign Application Priority Data

Jul. 20, 2018   (CN) .......................... 201810805625.3

(51) Int. Cl.
*G06F 9/46* (2006.01)
*G06F 9/48* (2006.01)

(52) U.S. Cl.
CPC .................. *G06F 9/4843* (2013.01)

(58) Field of Classification Search
CPC .................................................. G06F 9/4843
See application file for complete search history.

(56) References Cited

U.S. PATENT DOCUMENTS

| 7,899,791 B1* | 3/2011 | Gole ................... G06F 12/0804 |
| | | 707/654 |
| 2006/0232800 A1* | 10/2006 | Otake ................ H04N 1/40062 |
| | | 358/1.9 |

OTHER PUBLICATIONS

Extended European Search Report dated Sep. 30, 2019 in European Patent Application No. 19166088.5.

(Continued)

*Primary Examiner* — Camquy Truong
(74) *Attorney, Agent, or Firm* — Staas & Halsey LLP

(57) ABSTRACT

Disclosed are a method and apparatus for managing effectiveness of an information processing task in a decentralized data management system. The method comprising: sending requests for multiple information processing tasks by a client to multiple execution subjects, transmitting information processing tasks in a sequential information processing task list in an order to the multiple execution subjects; caching the requested information processing tasks to a task cache queue, caching the sequential information processing task list as a whole to the task cache queue; judging whether each information processing task in the task cache queue satisfies a predetermined conflict condition; moving the information processing task to a conflict task queue if it is determined that the task satisfies the predetermined conflict condition, deleting the task from the conflict task queue and caching the task to the task cache queue when the predetermined conflict condition is not satisfied.

20 Claims, 5 Drawing Sheets

(56) References Cited

OTHER PUBLICATIONS

Thomas Dickerson et al., "Adding Concurrency to Smart Contracts", Cornell University Library, XP080745816, Feb. 15, 2017, 18 pages.
Sergei Tikhomirov et al., "SmartCheck: Static Analysis of Ethereum Smart Contracts", 2018 ACM/IEEE $1^{st}$ International Workshop on Emerging Trends in Software Engineering for Blockchain, May 27, 2018, 8 pages.
Ilya Sergey et al., "A Concurrent Perspective on Smart Contracts", Cornell University Library, XP080747539, Feb. 17, 2017, 15 pages.
Jeremy Rubin et al., "Merkelized Abstract Syntax Trees", XP055624837, Dec. 16, 2014, 3 pages.

* cited by examiner

METHOD AND APPARATUS FOR MANAGING EFFECTIVENESS OF INFORMATION PROCESSING TASK

CROSS-REFERENCE TO RELATED APPLICATIONS

This application claims the priority benefit of Chinese Patent Application No. 201810805625.3, filed on Jul. 20, 2018 in the China National Intellectual Property Administration, the disclosure of which is incorporated herein in its entirety by reference.

FIELD

The present disclosure relates to the field of information processing, and particularly to a method and apparatus for managing effectiveness of an information processing task in a decentralized data management system.

BACKGROUND

A decentralized data management system comprises a client and multiple execution subjects for executing an information processing task initiated by the client, the client and the multiple execution subjects holding same database copies respectively. In a traditional decentralized data management system, it is impossible to detect a concurrency risk of executing information processing tasks before executing the information processing tasks. Thus, when multiple information processing tasks simultaneously operate same data, the traditional decentralized data management system does not have any warning information. Moreover, as to effectiveness of the information processing task, the traditional decentralized data management system only verifies whether or not versions of read data are consistent in results approved by both a client and multiple execution subjects and a state database of the execution subjects. The traditional decentralized data management system does not provide any solution to solve the problem of the conflict between the versions of the read data, and thus has a lower success rate of the verification of the information processing task.

More particularly, blockchain technology is an example of the above decentralized data management system. In recent years, the blockchain technology has been developed rapidly, which benefits from the success in Bitcoin. A blockchain, also called a distributed leger, is a structure saving data by multiple nodes which are trustless each other. All the nodes in the blockchain agree on an order of blocks. Each block contains several pieces of transaction information, and thus the blockchain can be regarded as many transactions which have been sorted. At present, there are several kinds of blockchain frameworks, such as a public chain, a private chain and a consortium chain.

In a traditional consortium chain, it is possible to save distributed ledger information between different subjects. However, the traditional consortium chain has the defect as stated above.

SUMMARY

A brief summary of the present disclosure is given below to provide a basic understanding of some aspects of the present disclosure. However, it should be understood that the summary is not an exhaustive summary of the present disclosure. It does not intend to define a key or important part of the present disclosure, nor does it intend to limit the scope of the present disclosure. The object of the summary is only to briefly present some concepts about the present disclosure, which serves as a preamble of the more detailed description that follows.

In view of the above problem, an object of the present disclosure is to provide a method and apparatus for managing effectiveness of an information processing task in a decentralized data management system which are capable of solving one or more defects in the prior art.

According to an aspect of the present disclosure, there is provided a method for managing effectiveness of an information processing task in a decentralized data management system, the decentralized data management system comprising a client and multiple execution subjects for executing an information processing task initiated by the client, the client and the multiple execution subjects holding same database copies respectively, wherein the respective database copies are updated based on results approved by both the client and the multiple execution subjects among execution results of the information processing task, the method comprising: sending requests for multiple information processing tasks by the client to the multiple execution subjects, wherein information processing tasks in a sequential information processing task list comprising at least two information processing tasks in an order are transmitted to the multiple execution subjects in the order, the sequential information processing task list is generated by performing concurrency risk detection on the requested multiple information processing tasks; caching the requested multiple information processing tasks to a task cache queue, wherein the sequential information processing task list is cached as a whole to the task cache queue; judging whether or not each information processing task in the task cache queue satisfies a predetermined conflict condition; and with respect to each information processing task in the task cache queue, moving the information processing task to a conflict task queue if it is determined that the information processing task satisfies the predetermined conflict condition, deleting the information processing task from the conflict task queue and caching the information processing task to the task cache queue for continuing with subsequent processing when the predetermined conflict condition is not satisfied.

According to another aspect of the present disclosure, there is provided an apparatus for managing effectiveness of an information processing task in a decentralized data management system, the decentralized data management system comprising a client and multiple execution subjects for executing an information processing task initiated by the client, the client and the multiple execution subjects holding same database copies respectively, wherein the respective database copies are updated based on results approved by both the client and the multiple execution subjects among execution results of the information processing task, the apparatus comprising: a concurrency risk detection unit configured to send requests for multiple information processing tasks at the client to the multiple execution subjects, wherein information processing tasks in a sequential information processing task list comprising at least two information processing tasks in an order are transmitted to the multiple execution subjects in the order, the sequential information processing task list is generated by performing concurrency risk detection on the requested multiple information processing tasks; a caching unit configured to cache the requested multiple information processing tasks to a task cache queue, wherein the sequential information processing task list is cached as a whole to the task cache queue; a judgment unit configured to judge whether or not each information processing task in the task cache queue satisfies a predetermined conflict condition; and a conflict processing unit configured to, with respect to each information processing task in the task cache queue, move the information processing task to a conflict task queue if it is determined that the information processing task satisfies the predetermined conflict condition, delete the information processing task from the conflict task queue and cache the information processing task to the task cache queue for continuing with subsequent processing when the predetermined conflict condition is not satisfied.

According to still another aspect of the present disclosure, there is provided a computer readable storage medium having recorded thereon a computer program that, when executed, is used for implementing a method for managing effectiveness of an information processing task in a decentralized data management system, the decentralized data management system comprising a client and multiple execution subjects for executing an information processing task initiated by the client, the client and the multiple execution subjects holding same database copies respectively, wherein the respective database copies are updated based on results approved by both the client and the multiple execution subjects among execution results of the information processing task, the method comprising: sending requests for multiple information processing tasks by the client to the multiple execution subjects, wherein information processing tasks in a sequential information processing task list comprising at least two information processing tasks in an order are transmitted to the multiple execution subjects in the order, the sequential information processing task list is generated by performing concurrency risk detection on the requested multiple information processing tasks; caching the requested multiple information processing tasks to a task cache queue, wherein the sequential information processing task list is cached as a whole to the task cache queue; judging whether or not each information processing task in the task cache queue satisfies a predetermined conflict condition; and with respect to each information processing task in the task cache queue, moving the information processing task to a conflict task queue if it is determined that the information processing task satisfies the predetermined conflict condition, deleting the information processing task from the conflict task queue and caching the information processing task to the task cache queue for continuing with subsequent processing when the predetermined conflict condition is not satisfied.

According to other aspects of the present disclosure, there is further provided a computer program code and a computer program product for implementing the above method according to the present disclosure.

Other aspects of embodiments of the present disclosure will be given in the following specification part, wherein preferred embodiments for sufficiently disclosing embodiments of the present disclosure are described in detail, without applying limitations thereto.

BRIEF DESCRIPTION OF THE DRAWINGS

The present disclosure can be better understood with reference to the detailed description given in conjunction with the appended drawings below, wherein throughout the drawings, same or similar reference signs are used to represent same or similar components. The appended drawings, together with the detailed descriptions below, are incorporated in the specification and form a part of the specification, to further describe preferred embodiments of the present disclosure and explain the principles and advantages of the present disclosure by way of examples. In the appended drawings.

DETAILED DESCRIPTION

Hereinafter, exemplary embodiments of the present disclosure will be described in detail in conjunction with the appended drawings. For the sake of clarity and conciseness, the specification does not describe all features of actual embodiments. However, it should be understood that in developing any such actual embodiment, many decisions specific to the embodiments must be made, so as to achieve specific objects of a developer; for example, those limitation conditions related to the system and services are met, and these limitation conditions possibly would vary as embodiments are different. In addition, it should also be appreciated that although developing tasks are possibly complicated and time-consuming, such developing tasks are only routine tasks for those skilled in the art benefiting from the contents of the present disclosure.

It should also be noted herein that, to avoid the present disclosure from being obscured due to unnecessary details, only those device structures and/or processing operations (steps) closely related to the solution according to the present disclosure are shown in the appended drawings, while omitting other details not closely related to the present disclosure.

Embodiments of the present disclosure will be described in detail in conjunction with the drawings below.

Figure 1:
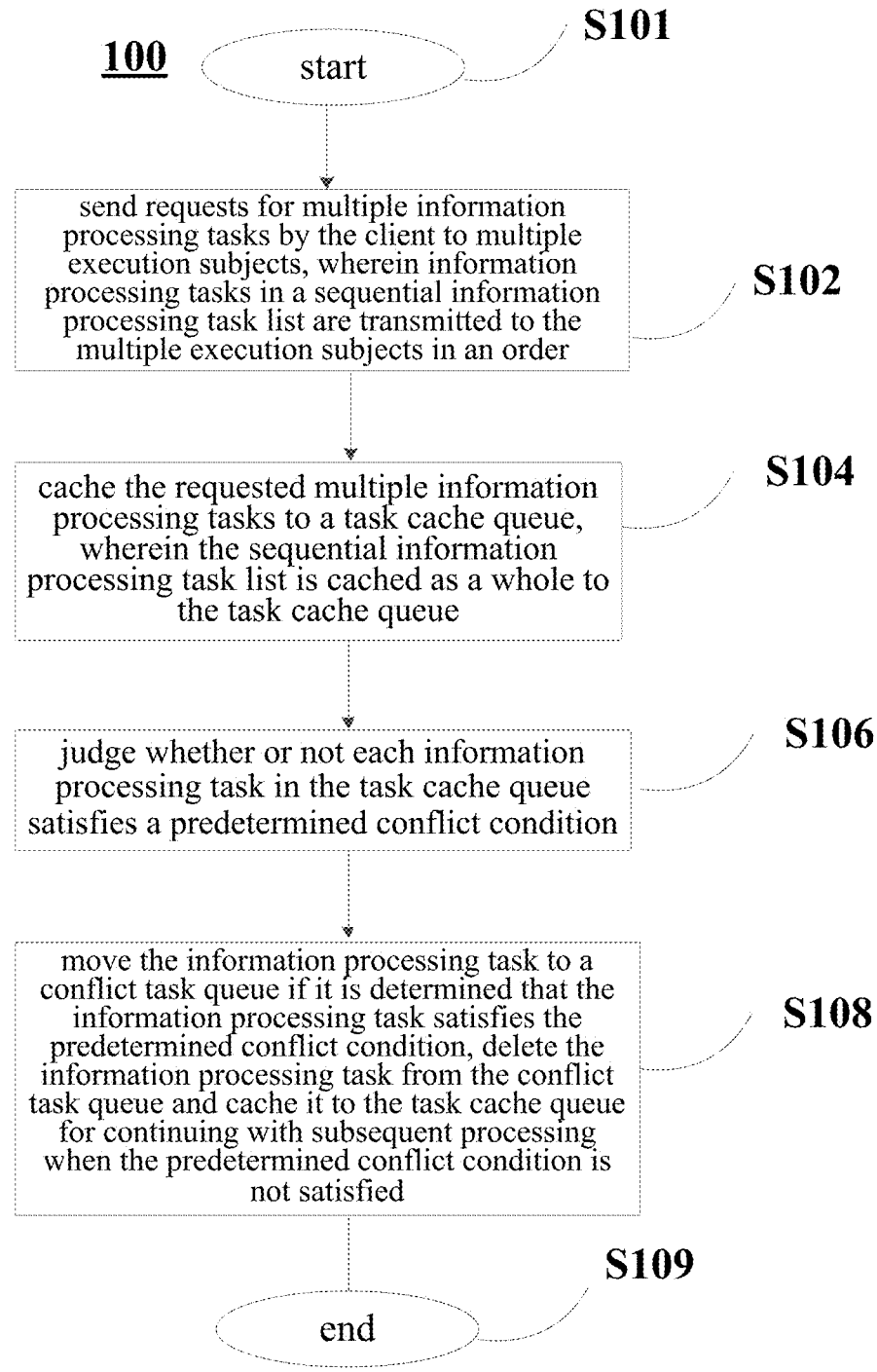
FIG. 1 is a flowchart showing a flow example of a method for managing effectiveness of an information processing task in a decentralized data management system according to an embodiment of the present disclosure.

Firstly, a flow example of a method 100 for managing effectiveness of an information processing task in a decentralized data management system according to an embodiment of the present disclosure will be described with reference to FIG. 1. FIG. 1 is a flowchart showing a flow example of the method 100 for managing effectiveness of an information processing task in a decentralized data management system according to the embodiment of the present disclosure. As shown in FIG. 1, the method 100 for managing effectiveness of an information processing task in a decentralized data management system according to the embodiment of the present disclosure comprises a concurrency risk detection operation S102, a caching operation S104, a judging operation S106 and a conflict processing operation S108.

The decentralized data management system comprises a client and multiple execution subjects for executing an information processing task initiated by the client, the client and the multiple execution subjects hold same database copies respectively, wherein the respective database copies are updated based on results approved by both the client and the multiple execution subjects among execution results of the information processing task. It should be noted that, the above client may be the above execution subjects capable of executing an information processing task, or the above client may be subjects holding same database copies as the above multiple execution subjects but incapable of executing an information processing task.

The method 100 for managing effectiveness of an information processing task in a decentralized data management system according to the embodiment of the present disclosure starts at S101.

In the concurrency risk detection operation S102, the client sends requests for multiple information processing tasks to the multiple execution subjects, wherein information processing tasks in a sequential information processing task list comprising at least two information processing tasks in an order are transmitted to the multiple execution subjects in the order, the sequential information processing task list is generated by performing concurrency risk detection on the requested multiple information processing tasks.

As an example, the client and the multiple execution subjects may be execution subjects which are trustless each other. The multiple information processing tasks comprise at least two information processing tasks.

In the traditional decentralized data management system, each information processing task sent by the client will be acquiesced as being concurrently transmitted to the requested execution subjects. Upon occurrence of the above concurrency, an execution order of the information processing tasks is uncertain; thus, a result of executing the information processing tasks is uncertain, that is, a concurrency risk possibly exists. For this reason, it is impossible to acquire a desired result of executing the information processing tasks.

However, in the method 100 for managing effectiveness of an information processing task in a decentralized data management system according to the embodiment of the present disclosure, before multiple information processing tasks are transmitted to the multiple execution subjects, concurrency risk detection is performed on the requested multiple information processing tasks at the client, and information processing tasks having a concurrency risk are sorted, thereby generating a sequential information processing task list comprising at least two information processing tasks in an order. As an example, it is possible to sort the information processing tasks according to the importance of the information processing tasks, and of course, those skilled in the art can also envisage other manners of sorting the information processing tasks. Then at the client, each information processing task in the sequential information processing task list is transmitted to the multiple execution subjects in its order in the sequential information processing task list, thereby making it possible to change the information processing tasks having a concurrency risk in the sequential information processing task list to be sequentially transmitted in the order, thus preventing a concurrency risk caused by concurrently transmitting information processing tasks.

In the caching operation S104, it is possible to cache the requested multiple information processing tasks to a task cache queue, wherein the sequential information processing task list is cached as a whole to the task cache queue.

As an example, the task cache queue is a First-In First-Out queue.

In the caching operation S104, prior to continuation with subsequent processing on the multiple information processing tasks, the client caches the multiple information processing tasks to a task cache queue. When the caching of the tasks is performed, the sequential information processing task list is cached as a whole to the task cache queue, thus making it possible to cause the information processing tasks in the sequential information processing task list to be sequentially verified and confirmed on the multiple execution subjects, i.e., making it possible to prevent the information processing tasks in the sequential information processing task list from being concurrently verified and confirmed on the multiple execution subjects to thereby prevent incapability of acquiring a desired result of the information processing tasks.

In the judging operation S106, it is judged whether or not each information processing task in the task cache queue satisfies a predetermined conflict condition.

As an example, the predetermined conflict condition may be a conflict condition set in advance by those skilled in the art according to experience. Hereinafter, the conflict condition will be described combined with read data and write data of an information processing task.

In the conflict processing operation S108, with respect to each information processing task in the task cache queue, the information processing task is moved to a conflict task queue if it is determined that the information processing task satisfies the predetermined conflict condition, and the information processing task is deleted from the conflict task queue and cached to the task cache queue for continuing with subsequent processing when the predetermined conflict condition is not satisfied.

As an example, in the conflict processing operation S108, the following measure capable of avoiding a conflict is adopted for an information processing task satisfying the predetermined conflict condition: moving the information processing task to a conflict task queue, and deleting the information processing task from the conflict task queue and caching the information processing task to the task cache queue when the predetermined conflict condition is not satisfied.

The method 100 for managing effectiveness of an information processing task in a decentralized data management system according to the embodiment of the present disclosure ends at S109.

A consortium chain is an example of the above decentralized data management system. When the method 100 for managing effectiveness of an information processing task in a decentralized data management system according to the embodiment of the present disclosure is applied in the consortium chain, the above execution subjects are execution nodes in the consortium chain, the above information processing tasks are transactions in the consortium chain, the above client may be the execution nodes or may be nodes holding same codes as the above multiple execution nodes but incapable of executing transactions, the above results approved by both the client and the multiple execution subjects are endorsing results obtained by executing transactions, the information processing tasks being verified and confirmed on the multiple execution subjects refers to performing verification and confirmation on transactions on the multiple execution nodes, the above subsequent processing may be a sorting service in the consortium chain, and applying the method 100 in the consortium chain will not be repeatedly described herein.

As can be seen from the above description, the method 100 for managing effectiveness of an information processing task in a decentralized data management system according to the embodiment of the present disclosure is capable of detecting a concurrency risk of information processing tasks in the decentralized data management system, and is capable of changing information processing tasks having a concurrency risk in the sequential information processing task list to be sequentially transmitted in an order, thus preventing a concurrency risk caused by concurrently transmitting information processing tasks; when the caching of the tasks is performed, the generated sequential information processing task list is cached as a whole to the task cache queue, thus making it possible to prevent the information processing tasks in the sequential information processing task list from being concurrently verified and confirmed; and a measure capable of avoiding a conflict is adopted for an information processing task satisfying the predetermined conflict condition, thus making it possible to improve effectiveness of the information processing tasks in the decentralized data management system.

Preferably, in the concurrency risk detection operation S102, generating the sequential information processing task list by performing concurrency risk detection on the requested multiple information processing tasks comprises: obtaining an execution result of executing each of the requested multiple information processing tasks, based on static code analysis performed on functions related to the information processing task in the decentralized data management system; determining a concurrency risk with respect to any pair of information processing tasks among the requested multiple information processing tasks based on the execution result; and sorting the pair of information processing tasks based on the determined concurrency risk of each pair of information processing tasks, to generate the sequential information processing task list.

As an example, executing an information processing task in the decentralized data management system means performing function invoking. Source codes of the client APP contain functions related to information processing tasks. Each information processing task will provide parameters of a function when it triggers the function. By performing analysis on the source codes of the client APP, a result of the function invoking can be obtained. The result of the function invoking includes read data and write data. As an example, the read data includes read sets Read sets, and the write data includes write sets Write sets. For example, an execution result (i.e., the result of the function invoking) of the information processing task can be represented as: Read set=[(key, value)], Write set=[(key, value)], where key represents a key, and value represents a key value. That is, the read sets and the write sets each can include multiple pairs, each pair including a key and a key value. In addition, the type writeType of the key value 'value' in the write set can also be obtained from the source codes of the client APP; for example, writeType may be "Battery", "Car", etc. Hereinafter to facilitate description, sometimes, the key in Write set is represented as a write key writeKey, and the key in the Read set is represented as a read key readKey.

Since the client and the multiple execution subjects hold same database copies respectively (that is, the client and the multiple execution subjects all have same source codes), before the client transmits multiple information processing tasks to the multiple execution subjects, it is possible to perform static code analysis on functions related to the information processing tasks based on the source codes of the client APP, to obtain an execution result of executing each information processing task (i.e., to obtain in advance an execution result of executing each information processing task before performing the information processing task on the multiple execution subjects). It should be noted that, the object of obtaining in advance an execution result of executing each information processing task through static code analysis before performing the information processing task on the multiple execution subjects lies in: by means of the execution result of the information processing task which is obtained through the static code analysis, it is possible to perform the above concurrency risk detection on the multiple information processing tasks.

Figure 2:
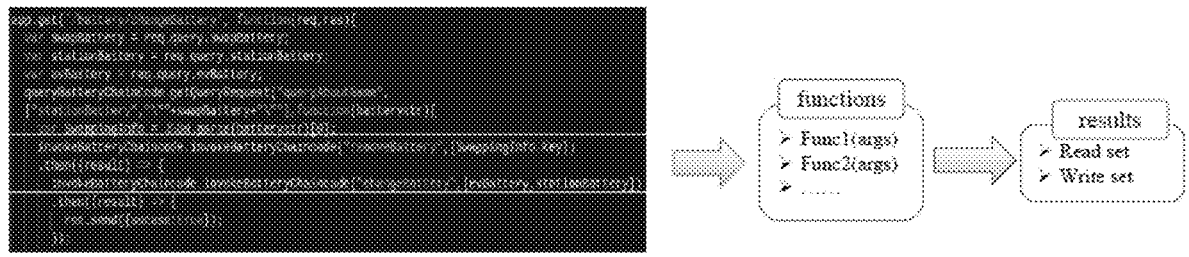
FIG. 2 is a view schematically showing an example of source codes of a client APP.

FIG. 2 is a view schematically showing an example of the source codes of the client APP.

The leftmost side of FIG. 2 shows the source codes of the client APP. The middle part of FIG. 2 shows functions related to information processing tasks which are extracted from the source codes, such as Func1(args), Func2(args) and the like, wherein Func1 and Func2 are function names, and args are parameters of the functions. As an example, Func1 may be "removeBattery" in the source codes, and Func2 may be "changeBattery" in the source codes. The rightmost side of FIG. 2 shows a result of executing an information processing task which is obtained by performing analysis on the source codes of the client APP, i.e., a result of function invoking; for example, the result includes read set Read set and write set Write set. In addition, it is also possible to determine writeType, for example to determine writeType to be "Battery", according to the source codes of the client APP as shown in FIG. 2.

Preferably, obtaining an execution result of each of the requested multiple information processing tasks comprises: obtaining, by performing static code analysis on functions related to the information processing task in the decentralized data management system, a syntax tree of executing the functions related to the information processing task; and obtaining, based on the syntax tree, an execution result of executing each requested information processing task.

Figure 3:
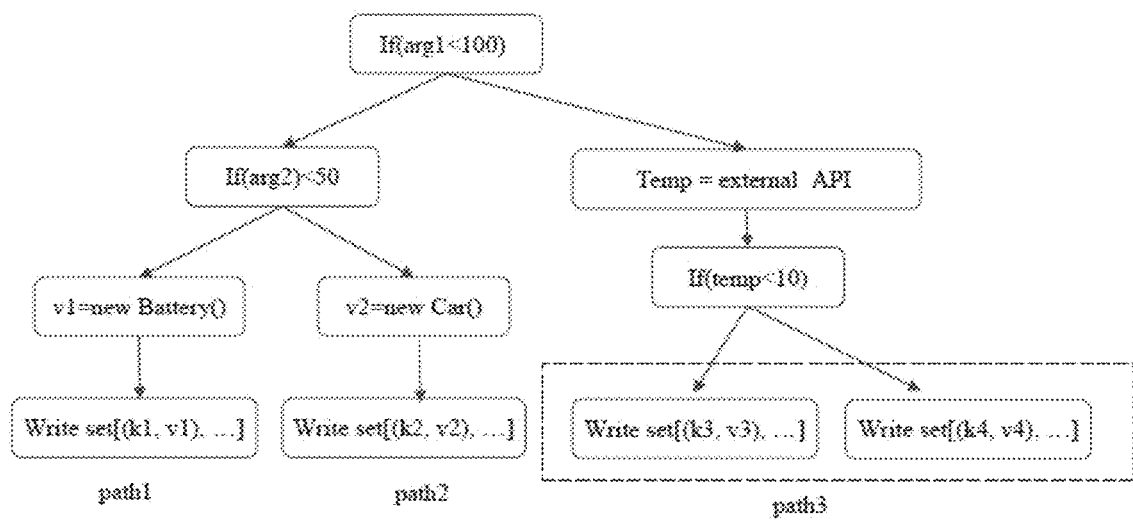
FIG. 3 is a view schematically showing an example of static code analysis according to an embodiment of the present disclosure.

FIG. 3 is a view schematically showing an example of static code analysis according to an embodiment of the present disclosure. In FIG. 3, by performing static code analysis on a function changeBattery (arg1, arg2) (where arg1 and arg2 are parameters of the function, respectively), an abstract syntax tree is generated for the function. In the generated syntax tree, paths of executing the function, path constraint conditions and all possible execution results are recorded. As shown in FIG. 3, all possible execution paths include: path1, path2 and path3.

Taking path1 as an example, as shown in FIG. 3, a condition (i.e., path constraint condition) of executing path1 is condition(path1):{(arg1<100) & (arg2<50)}, that is, the path path1 is executed under the condition that arg1<100 and arg2<50.

Possible execution results of the respective paths in FIG. 3 will be described below.

As shown in FIG. 3, an execution result of path1 is: Write set[(k1, v1), . . . ]. In a case where the above Write set is specifically represented as writeKey and writeType, representation can be made as follows: writeKey set={(k1, . . . }, writeType set={Battery, . . . }, where the writeKey set represents a set of writeKey and the writeType set represents a set of writeType. To be specific, a write set of the execution result of path1 includes multiple pairs, each pair including a key and a key value. As an example, in FIG. 3, only a pair (k1, v1) included in the write set of the execution result of path1 is shown, in which pair a key is k1 and a key value is v1. According to the syntax tree, it can be obtained that the type of v1 is Battery. With respect to other pairs included in the write set of the execution result of path1, types of key values can also be obtained according to the syntax tree. Thus, with respect to all the pairs in the write set, the set of writeKey and the set of writeType can be represented as follows: writeKey set={k1, . . . }, writeType set= {Battery, . . . }. PAs shown in FIG. 3, an execution result of path2 is: Write set[(k2, v2), . . . ], where k2 is a key, and v2 is a key value. In a case where the above Write set is specifically represented as writeKey and writeTyps, representation can be made as follows: writeKey set={(k2, . . . }, writeType set={Car, . . . }, where Car represents the type of the key value v2. PSince path3 contains external API invoking, the two branches thereof (the two branches whose execution results are Write set[(k3, v3), . . . ] and Write set[(k4, v4), . . . ], respectively) will be taken as a path, as shown by the dashed boxes in path 3. That is, an execution result of path3 is Write set[(k3, v3),] and Write set[(k4, v4), . . . ], where k3 is a key and v3 is a corresponding key value, k4 is a key and v4 is a corresponding key value. PPreferably, obtaining, based on the syntax tree, an execution result of executing each requested information processing task comprises: collecting execution paths, conditions of execution paths and execution results of all paths of functions related to the information processing tasks according to the syntax tree; and with respect to each requested information processing task, obtaining an execution result of executing each requested information processing task by performing mapping with the execution paths and the conditions of execution paths. PAs stated above, the syntax tree obtained by performing static code analysis on the APP source codes comprises execution paths, conditions of execution paths and execution results of all paths of functions related to the information processing tasks. An information processing task carrying parameters performs mapping with the conditions of execution paths (i.e., path constraint conditions), to make it possible to determine an execution path of the information processing task from among candidate execution paths. Accordingly, it is possible to take, as an execution result of the requested information processing task, an execution result of the determined execution path in the syntax tree. PPreferably, determining a concurrency risk with respect to any pair of information processing tasks based on the execution result comprises: computing a concurrency risk score, based on the characteristic and the type of write data in an execution result with respect to each information processing task in the pair of information processing tasks. PAs an example, the characteristic of the write data in the execution result of the information processing task may be writeKey in a write set, and the type of the write data may be writeType.

It is assumed that the requested multiple information processing tasks are tx1, tx2, . . . .

We compute a concurrency risk score concurrencyRiskScore between the two information processing tasks tx1 and tx2 as follows:

$$concurrencyRiskScore(tx1, tx2) = \begin{cases} 100, & \text{if } writeKey \text{ set}(tx1) \cap writeKey \text{ set}(tx2) \text{ exist} \\ typeConflictScore * weight, & \text{else if } writeType \text{ set}(tx1) \cap writeType \text{ set}(tx2) \text{ exist} \\ 0, & \text{no same } writeKey \text{ and } writeType \end{cases} \quad (1)$$

In the expression (1), writeKey set(tx1) represents a writeKey set of tx1, writeType set(tx1) represents a writeType set of tx1, writeKey set(tx2) represents a writeKey set of tx2, and writeType set(tx2) represents a writeType set of tx2. Moreover, typeConfilctScore is a type conflict score as shown in the following expression (2), and weight represents a weight.

As can be seen from the expression (1), if there are intersection sets between the writeKey sets of the two information processing tasks tx1 and tx2, that is, the two information processing tasks have same writekey, then the execution order of the information processing tasks tx1 and tx2 is uncertain upon occurrence of concurrency, which necessarily causes different values to be written for the same writeKey, and thus a concurrency risk necessarily exists. Accordingly, in the case where there are intersection sets between the writeKey sets of the two information processing tasks tx1 and tx2, a highest concurrency risk score is 100 scores.

As an example, it is assumed that: an execution result of t1 as can be seen from the syntax tree is write set[(k1, v1), (k3, v3), . . . ], i.e., writeKey set={k1,k3}, and it can be obtained that writeType set={Battery, Car}; an execution result of t2 as can be seen from the syntax tree is Write set[(k1, v1'), (k4, v4), . . . ], i.e., writeKey set={k1,k4}, and it can be obtained that writeType set={Battery, Bus}. In the example, there are intersection sets between the writeKey sets of the two information processing tasks tx1 and tx2, that is, the two information processing tasks have same writeKey=k1, the execution order of the information processing tasks are tx1 and tx2 is uncertain upon occurrence of concurrency, k1 will be written as v1 or v1', and thus the information processing tasks tx1 and tx2 necessarily will have a concurrency risk.

In addition, as can be seen from the expression (1), if there are no intersection sets between the writeKey sets of the two information processing tasks tx1 and tx2 and also there are no intersection sets between the writeType sets thereof, that is, the two information processing tasks do not have same writeKey and writeType, then the information processing tasks tx1, tx2 will have no concurrency risk even if concurrency occurs because they do not perform writing on the same writeKey and writeType, Accordingly, in the case where the two information processing tasks tx1 and tx2 do not have same writeKey and writeType, a concurrency risk score is 0.

In addition, as can be seen from the expression (1), if there are no intersection sets between the writeKey sets of the two information processing tasks tx1 and tx2 but there are intersection sets between the writeType sets thereof, that is, the two information processing tasks do not have same writeKey but have same writeType, then the information processing tasks tx1 and tx2 have a concurrency risk to some extent. As an example, if the two information processing tasks tx1 and tx2 have same writeTpye=Battery, then the two information processing tasks possibly write different values to same writekey whose key value types are Battery, and thus have a concurrency risk to some extent. The concurrency risk score in this case can be represented by the product of the type conflict score typeConflictScore and the weight, wherein the weight can be set in advance by those skilled in the art according to experience, and moreover, the type conflict score typeConflictScore is as shown by the following expression (2):

$$tyypeConflictScore = 100 * \frac{\text{count}(writeType\ \text{set}(tx1) \cap writeType\ \text{set}(tx2))}{\text{count}(writeType\ \text{set}(tx1) \cup writeType\ \text{set}(tx2))} \quad (2)$$

In the expression (2), count(writeType set(tx1)∩writeType set(tx2)) represents the number of the same writeType existing in the writeType set of the information processing task tx1 and the writeType set of the information processing task tx2, and count(writeType set(tx1) U writeType set(tx2)) represents the total number of the writeTypes existing in the writeType set of the information processing task tx1 and the writeType set of the information processing task tx2. As can be seen from the expression (2), the larger the number of the same writeType existing in the information processing tasks tx1 and tx2 is, the higher the type conflict score typeConflictScore is.

As can be seen from the above description, the method 100 for managing effectiveness of an information processing task in a decentralized data management system according to the embodiment of the present disclosure can detect a concurrency risk of information processing tasks based on static code analysis before dynamically executing the information processing tasks on multiple execution subjects.

To more clearly describe concurrency risk detection processing in the method 100 for managing effectiveness of an information processing task in a decentralized data management system according to the embodiment of the present disclosure, an exemplary flow of concurrency risk detection processing according to an embodiment of the present application will be described in combination with FIG. 4 below.

Figure 4:
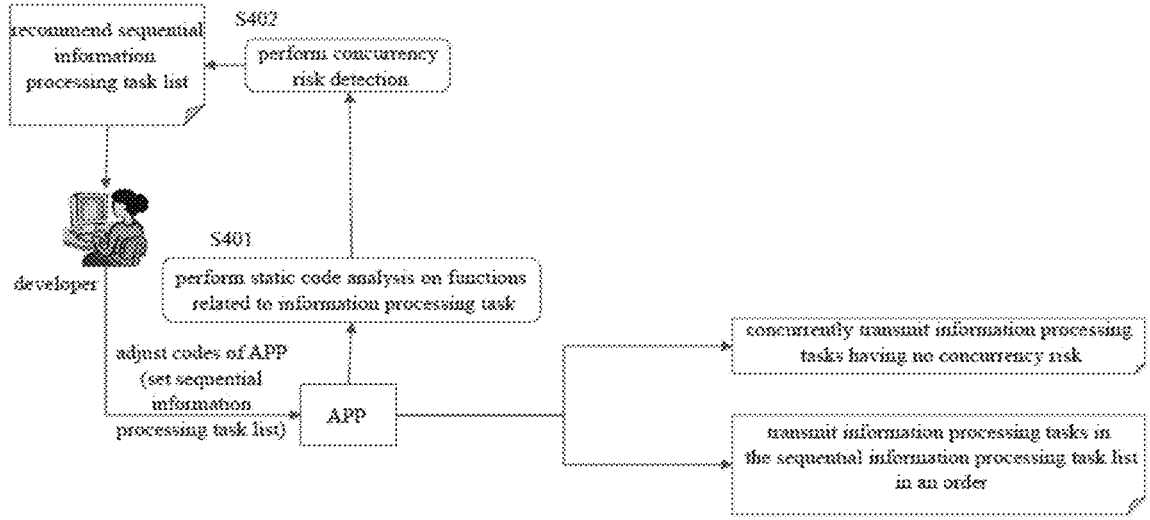
FIG. 4 is an exemplary flowchart describing concurrency risk detection processing according to an embodiment of the present disclosure.

As shown in FIG. 4, in operation S401, in the APP of the client, static code analysis is performed on functions related to the information processing task, to obtain a syntax tree. In operation S402, concurrency risk detection is performed with respect to each pair of the requested information processing tasks based on the syntax tree. In operation S403, the information processing tasks are sorted based on a concurrency risk determined with respect to each pair of the requested information processing tasks, to generate a sequential information processing task list, and sequential transmission of information processing tasks in the generated sequential information processing task list is recommended to a developer. The developer can adjust the codes of the APP of the client to set the sequential information processing task list, whereby in the APP of the client, the information processing tasks in the sequential information processing task list are transmitted to the execution subjects in the decentralized data management system in an order, thus avoiding a concurrency risk of executing the information processing tasks. With respect to information processing tasks having no concurrency risk, these information processing tasks having no concurrency risk can be concurrently transmitted to the execution subjects.

When the method 100 according to the embodiment of the present disclosure is applied in a consortium chain to detect a concurrency risk of information processing tasks, execution results of the above information processing tasks are endorsing results in the consortium chain. The detection of the concurrency risk of the information processing tasks in the consortium chain will no longer be repeatedly described herein.

Figure 5:
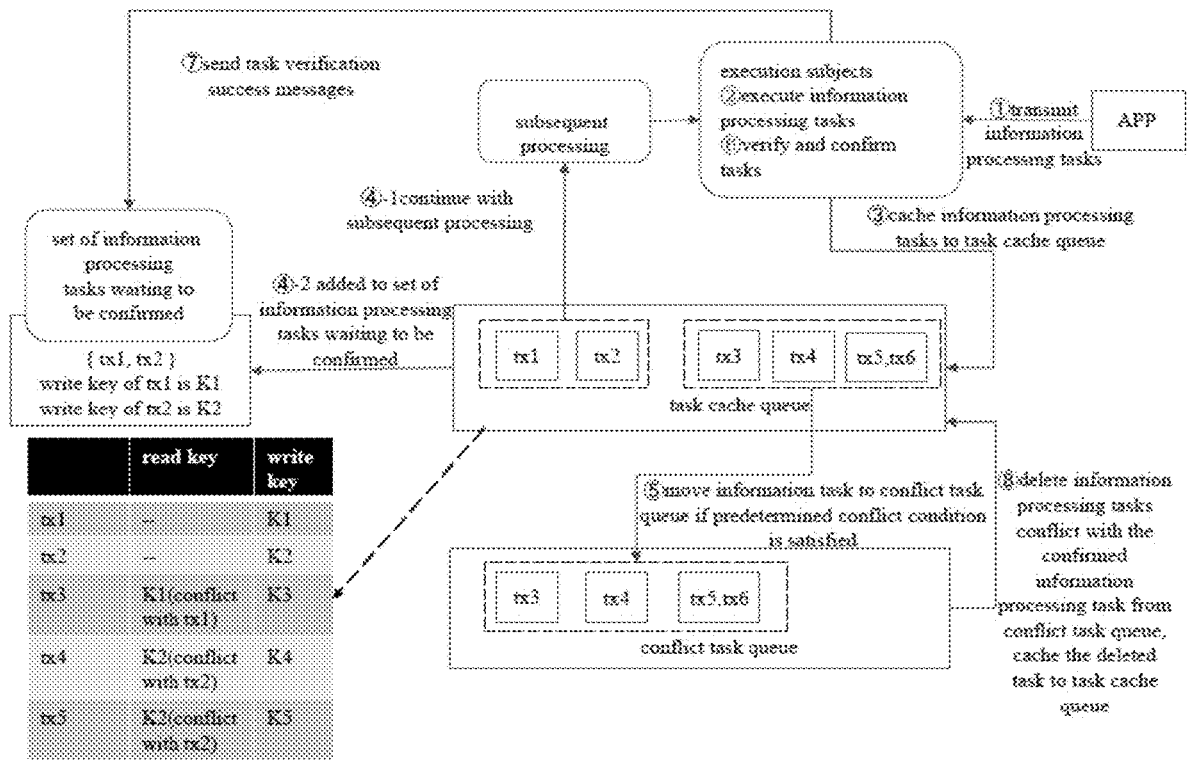
FIG. 5 is a view showing an example of processing of managing effectiveness of an information processing task according to an embodiment of the present disclosure.

Hereinafter, the processing in the caching operation S104 through the conflict processing operation S108 in the method 100 will be further described in combination with FIG. 5. FIG. 5 is a view showing an example of processing of managing effectiveness of an information processing task according to an embodiment of the present disclosure.

As shown by ① in FIG. 5, the client APP transmits information processing tasks to multiple execution subjects in the decentralized data management system.

As an example, in FIG. 5, there are six information processing tasks: tx1, tx2, tx3, tx4, tx5 and tx6, wherein it is assumed that tx5 and tx6 are a pair of information processing tasks having a concurrency risk. In the concurrency risk detection operation S102, the pair of information processing tasks (tx5 and tx6) having a concurrency risk is detected through static code analysis and tx5 and tx6 are sorted, and a sequential information processing task list comprising the two information processing tasks tx5 and tx6 is generated. The client transmits tx5 and tx6 to the multiple execution subjects in an order, and concurrently transmits tx1, tx2, tx3 and tx4 having no concurrency risk to the multiple execution subjects.

As shown by ② in FIG. 5, upon receipt of the multiple information processing tasks, the multiple execution subjects receiving the information processing tasks dynamically execute the information processing tasks respectively, to generate execution results of the information processing tasks. The client receives the execution results returned from the multiple execution subjects. To be more specific, the execution results of the information processing tasks contain read set and write set (Read sets and Write sets).

Preferably, in the caching operation S104, caching the requested multiple information processing tasks to the task cache queue comprises: sequentially caching information processing tasks having no concurrency risk to the task cache queue.

As shown in FIG. 5, the information processing tasks tx1, tx2, tx3 and tx4 having no concurrency risk are sequentially cached to the task cache queue.

In addition, as stated above when describing the caching operation S104, the sequential information processing task list (tx5 and tx6) is cached as a whole to the task cache queue.

As shown in FIG. 5, the following information tasks are sequentially cached to the task cache queue: tx1, tx2, tx3, tx4, (tx5 and tx6).

Preferably, in the caching operation S104, caching the requested multiple information processing tasks to the task cache queue comprises: with respect to each task among concurrent information processing tasks having no concurrency risk, caching a read set and a write set obtained by executing each task according to a processing rule in the decentralized data management system, in association with the information processing task, to the task cache queue; and with respect to the sequential information processing task list, only caching a read set and a write set obtained by executing an information processing task whose order is the first in the sequential information processing task list according to the processing rule, in association with the sequential information processing task list, to the task cache queue. That is, as shown by ③ in FIG. 5, the requested information processing task is cached together with the read set and the write set to the task cache queue.

As an example, with respect to the information processing tasks tx1, tx2, tx3 and tx4 having no concurrency risk, a read set and a write set obtained by executing each task are cached in association with the information processing task to the task cache queue. As shown by the "read key/write key list" in FIG. 5, tx1 has no read operation, and thus readKey of tx1 is empty, and moreover, writeKey of tx1 is K1; t2 has no read operation, and thus readKey of tx2 is empty, and moreover, writeKey of tx2 is K2; readKey of tx3 is K1, and writeKey of tx3 is K3; readKey of tx4 is K2, and writeKey of tx4 is K4.

As an example, with respect to the sequential information processing task list comprising tx5 and tx6, since the sequential information processing task list is cached as a whole to the task cache queue, only a read set and a write set obtained by executing the information processing task tx5 whose order is the first in the sequential information processing task list are cached in association with the sequential information processing task list to the task cache queue. As shown by the "read key/write key list" in FIG. 5, readKey of tx5 is K2, and writeKey of tx5 is K5.

A set of information processing tasks waiting to be confirmed is set. The set of information processing tasks waiting to be confirmed is initially an empty set.

Preferably, in the judging operation S106, judging whether or not one information processing task in the task cache queue satisfies a predetermined conflict condition comprises: determining that the one information processing task does not satisfy the predetermined conflict condition, if the one information processing task is not conflict with any information processing task included in the set of information processing tasks waiting to be confirmed; and determining that the one information processing task satisfies the predetermined conflict condition, if the one information processing task is conflict with any information processing task included in the set of information processing tasks waiting to be confirmed.

Preferably, judging whether or not one information processing task in the task cache queue satisfies a predetermined conflict condition further comprises: determining that the one information processing task does not satisfy the predetermined conflict condition, if read data obtained by executing the one information processing task according to a processing rule in the decentralized data management system is not the same as write data obtained by executing any information processing task included in the set of information processing tasks waiting to be confirmed according to the processing rule; and determining that the one information processing task satisfies the predetermined conflict condition, if read data obtained by executing the one information processing task according to the processing rule is the same as write data obtained by executing any information processing task included in the set of information processing tasks waiting to be confirmed according to the processing rule.

As stated above, the following information processing tasks are sequentially cached to the task cache queue as shown in FIG. 5: tx1, tx2, tx3, tx4, (tx5 and tx6). Since the set of information processing tasks waiting to be confirmed is initially an empty set and both the first and second information processing tasks tx1 and tx2 in the task cache queue have no read key, the cached information processing tasks tx1 and tx2 do not satisfy the above read and write conflict condition.

As an example, in a case where the decentralized data management system is a consortium chain, the result obtained by executing the one information processing task is an endorsing result; the set of information processing tasks waiting to be confirmed is a set of transactions waiting to be verified and confirmed by nodes at a transaction verification phase; and executing the one information processing task according to the processing rule in the decentralized data management system is equivalent to performing chain codes with respect to the one information processing task. If a read key obtained by performing chain codes with respect to the one information processing task is not the same as a write key obtained by executing chain codes with respect to any information processing task included in the set of information processing tasks waiting to be confirmed, it is determined that the one information processing task does not satisfy the predetermined conflict condition; and if a read key obtained by performing chain codes with respect to the one information processing task is the same as a write key obtained by executing chain codes with respect to any information processing task included in the set of information processing tasks waiting to be confirmed, it is determined that the one information processing task satisfies the predetermined conflict condition.

As can be seen from the above description, it is possible to determine, by performing a comparison on the read data obtained by executing the one information processing task and the write data obtained by executing any information processing task included in the set of information processing tasks waiting to be confirmed, whether or not the predetermined conflict condition is satisfied. Moreover, as can be seen from the processing in the conflict processing operation S108, it is possible to move the information processing task having the above read and write conflict to the conflict task queue to avoid a conflict.

Preferably, in the conflict processing operation S108, with respect to each information processing task in the task cache queue, if it is determined that the information processing task does not satisfy the predetermined conflict condition, the information processing task is caused to continue with subsequent processing.

As an example, as shown by ④-1 in FIG. 5, the information processing tasks tx1 and tx2 are caused to continue with subsequent processing.

In a case where the decentralized data management system is a consortium chain, the above subsequent processing may be a sorting service. That is, in the conflict processing operation S108, if it is determined that an information processing task in the task cache queue does not satisfy the predetermined conflict condition, the information processing task is caused to be transmitted to the sorting service.

Preferably, in the conflict processing operation S108, while causing the information processing task in the task cache queue to continue with subsequent processing, the set of information processing tasks waiting to be confirmed is updated by adding the transmitted information processing tasks to the set of information processing tasks waiting to be confirmed.

As an example, as shown by ④-2 in FIG. 5, the information processing tasks tx1 and tx2 are added to the set of information processing tasks waiting to be confirmed, to update the set of information processing tasks waiting to be confirmed. That is, the updated set of information processing tasks waiting to be confirmed includes tx1 and tx2, wherein a write key of tx1 is K1, and a write key of tx2 is K2.

With respect to the remaining processing tasks tx3, tx4 and (tx5 and tx6) in the task cache queue, since the read key K1 of tx3 is the same as the write key K1 of tx1 in the updated set of information processing tasks waiting to be confirmed, it is determined that tx3 satisfies the above predetermined conflict condition, thereby moving tx3 to the conflict task queue, as stated above in the conflict processing operation S108; since the read key K2 of tx4 is the same as the write key K2 of tx2 in the updated set of information processing tasks waiting to be confirmed, it is determined that tx4 satisfies the above predetermined conflict condition, thereby also moving tx4 to the conflict task queue; and since the read key K2 of tx5 is the same as the write key K2 of tx2 in the updated set of information processing tasks waiting to be confirmed, it is determined that tx5 satisfies the above predetermined conflict condition, thereby also moving the sequential information processing task list (tx5 and tx6) to the conflict task queue. That is, as shown by ⑤ in FIG. 5, tx3, tx4 and (tx5 and tx6) are all moved to the conflict task queue.

Preferably, in the conflict processing operation S108, after the information processing tasks continuing with subsequent information are verified and confirmed by multiple execution subjects, the set of information processing tasks waiting to be confirmed is updated by deleting the confirmed information processing tasks from the set of information processing tasks waiting to be confirmed, and information processing tasks conflict with the confirmed information processing task are deleted from the conflict task queue and the deleted tasks are cached to the task cache queue.

As an example, as shown by ⑥ in FIG. 5, the information processing tasks tx1 and tx2 continuing with subsequent information are verified and confirmed on the client and the multiple execution subjects. As an example, the client and the multiple execution subjects first verify and confirm tx1, and save execution results of tx1 in a local data state database, that is, the respective database copies held by the client and the multiple execution subjects respectively are updated based on execution results of tx1 approved by both the client and the multiple execution subjects.

After the client and the multiple execution subjects verify and confirm tx1, the multiple execution subjects send task verification success messages, for example, send task verification success messages about tx1, as shown by ⑦ in FIG. 5. After the client receives the task verification success messages, the confirmed information processing task tx1 is deleted from the set of information processing tasks waiting to be confirmed, such that the set of information processing tasks waiting to be confirmed includes only tx2, and thus conflicts of some information processing tasks in the conflict task queue disappear. For example, tx3 in the conflict task queue is no longer conflict with the information processing tasks in the set of information processing tasks waiting to be confirmed. Thus, as shown by ⑧ in FIG. 5, the information processing task tx3 conflicted with the confirmed information processing task tx1 is deleted from the conflict task queue, and the deleted task tx3 is cached to the task cache queue.

As an example, after the conflict task (e.g., tx3) is cached again to the task cache queue, the task (e.g., tx3) cached again is re-executed on the multiple execution subjects, and execution result is acquired, and it is judged again based on the execution result whether or not the task cached again is capable of directly performing subsequent processing. That is, with respect to the task (e.g., tx3) cached again, the methods in ②-⑧ in FIG. 5 are repeatedly used.

Preferably, in the conflict processing operation S108, when subsequent processing is continued for one information processing task in the sequential information processing task list, all information processing tasks following the one information processing task in the sequential information processing task list wait without continuation with subsequent processing; and subsequent processing is not continued for the information processing task immediately following the one information processing task, until the one information processing task has been confirmed.

As an example, with respect to the sequential information processing task list (tx5 and tx6) in FIG. 5, when subsequent processing is continued for the information processing task tx5, the information processing task tx6 following the information processing task tx5 waits without continuation with subsequent processing; and subsequent processing is not continued for the information processing task tx6 following the information processing task tx5, until the information processing task tx5 has been confirmed.

As such, it is possible to cause the information processing tasks in the sequential information processing task list not to be concurrently verified and confirmed, but to be sequentially verified and confirmed, thus making it possible to improve effectiveness of an information processing task in the decentralized data management system.

As an example, the method 100 for managing effectiveness of an information processing task in a decentralized data management system according to the embodiment of the present disclosure can be applied to a medical blockchain. Blockchain participant subjects include a hospital, an insurance company and an individual. That is, computers located at a hospital, an insurance company and an individual can be execution nodes in the blockchain. There may be multiple hospitals, each of which maintains diagnostic data of patients in that hospital. An individual maintains his/her own diagnostic data in all the hospitals. Hash values of the diagnostic data in the hospital and the diagnostic data of the individual (the amount of data can be reduced by saving hash values) are both saved on the blockchain. History case records saved by the hospitals and the individual are not tamperable and are decentralized. If it is desired to share data between hospitals, a transaction must be initiated to get an agreement from the other party. If a hospital desires to acquire data of an individual, it shall also initiate a transaction to get an agreement from the other party. All data use histories will be recorded on the blockchain. An insurance company can initiate a transaction to acquire history case records from a hospital or an individual, and then customize a medical insurance preferential plan. For example, the hospital, the insurance company and the individual may include the client in FIG. 4.

In addition, the method 100 for managing effectiveness of an information processing task in a decentralized data management system according to the embodiment of the present disclosure can also be applied to a supply chain, e.g., a food traceability system describing import beef. Blockchain participant subjects include a cow-raising pasture, a beef production enterprise, a transport enterprise, a sales enterprise, etc. Each enterprise maintains its own nodes, to save all the states of beef. Each step of beef production will be saved on the blockchain. Data on the blockchain is decentralized and tramper-proof. In case of a food safety issue occurring to the beef, it is possible to find out, through a blockchain traceability source, to which enterprise the issue occurs.

Corresponding to the above method embodiment for managing effectiveness of an information processing task in a decentralized data management system, the present disclosure further provides the following embodiment of an apparatus 600 for managing effectiveness of an information processing task in a decentralized data management system.

Figure 6:
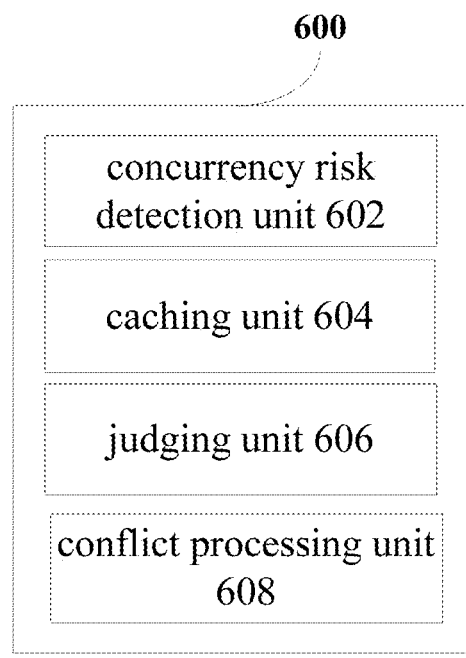
FIG. 6 is a block diagram showing a function configuration example of an apparatus for managing effectiveness of an information processing task in a decentralized data management system according to an embodiment of the present disclosure.

FIG. 6 is a block diagram showing a function configuration example of the apparatus 600 for managing effectiveness of an information processing task in a decentralized data management system according to the embodiment of the present disclosure.

As shown in FIG. 6, the apparatus 600 for managing effectiveness of an information processing task in a decentralized data management system according to the embodiment of the present disclosure can comprise a concurrency risk detection unit 602, a caching unit 604, a judging unit 606 and a conflict processing unit 608. Next, function configuration examples of the concurrency risk detection unit 602, the caching unit 604, the judging unit 606 and the conflict processing unit 608 will be described.

The decentralized data management system comprises a client and multiple execution subjects for executing an information processing task initiated by the client, the client and the multiple execution subjects holding same database copies respectively, wherein the respective database copies are updated based on results approved by both the client and the multiple execution subjects among execution results of the information processing task.

In the concurrency risk detection unit 602, the client sends requests for multiple information processing tasks to the multiple execution subjects, wherein information processing tasks in a sequential information processing task list comprising at least two information processing tasks in an order are transmitted to the multiple execution subjects in the order, the sequential information processing task list is generated by performing concurrency risk detection on the requested multiple information processing tasks.

As an example, the client and the multiple execution subjects may be execution subjects which are trustless each other. The multiple information processing tasks comprise at least two information processing tasks.

In the traditional decentralized data management system, each information processing task sent by the client will be acquiesced as being concurrently transmitted to the requested execution subjects. Upon occurrence of the above concurrency, an execution order of the information processing tasks is uncertain; thus, a result of executing the information processing tasks is uncertain, that is, a concurrency risk possibly exists. For this reason, it is impossible to acquire a desired result of executing the information processing tasks.

However, in the apparatus 600 for managing effectiveness of an information processing task in a decentralized data management system according to the embodiment of the present disclosure, before multiple information processing tasks are transmitted to the multiple execution subjects, concurrency risk detection is performed on the requested multiple information processing tasks at the client, and information processing tasks having a concurrency risk are sorted, thereby generating a sequential information processing task list comprising at least two information processing tasks in an order. As an example, it is possible to sort the information processing tasks according to the importance of the information processing tasks, and of course, those skilled in the art can also envisage other manners of sorting the information processing tasks. Then at the client, each information processing task in the sequential information processing task list is transmitted to the multiple execution subjects in its order in the sequential information processing task list, thereby making it possible to change the information processing tasks having a concurrency risk in the sequential information processing task list to be sequentially transmitted in the order, thus preventing a concurrency risk caused by concurrently transmitting information processing tasks.

The caching unit 604 is configured to: cache the requested multiple information processing tasks to a task cache queue, wherein the sequential information processing task list is cached as a whole to the task cache queue.

As an example, the task cache queue is a First-In First-Out queue.

In the caching unit 604, prior to continuation with subsequent processing on the multiple information processing tasks, the client caches the multiple information processing tasks to a task cache queue. When the caching of the tasks is performed, the sequential information processing task list is cached as a whole to the task cache queue, thus making it possible to cause the information processing tasks in the sequential information processing task list to be sequentially verified and confirmed on the multiple execution subjects, i.e., making it possible to prevent the information processing tasks in the sequential information processing task list from being concurrently verified and confirmed on the multiple execution subjects to thereby prevent incapability of acquiring a desired result of the information processing tasks.

The judging unit 606 is configured to: judge whether or not each information processing task in the task cache queue satisfies a predetermined conflict condition.

As an example, the predetermined conflict condition may be a conflict condition set in advance by those skilled in the art according to experience.

The conflict processing unit 608 is configured to: with respect to each information processing task in the task cache queue, move the information processing task to a conflict task queue if it is determined that the information processing task satisfies the predetermined conflict condition, and delete the information processing task from the conflict task queue and cache the information processing task to the task cache queue for continuing with subsequent processing when the predetermined conflict condition is not satisfied.

As an example, in the conflict processing unit 608, the following measure capable of avoiding a conflict is adopted for an information processing task satisfying the predetermined conflict condition: moving the information processing task to a conflict task queue, and deleting the information processing task from the conflict task queue and caching the information processing task to the task cache queue when the predetermined conflict condition is not satisfied.

As can be seen from the above description, the apparatus 600 for managing effectiveness of an information processing task in a decentralized data management system according to the embodiment of the present disclosure is capable of detecting a concurrency risk of information processing tasks in the decentralized data management system, and is capable of changing information processing tasks having a concurrency risk in the decentralized data management system to be sequentially transmitted in an order, thus preventing a concurrency risk caused by concurrently transmitting information processing tasks; when the caching of the tasks is performed, the generated sequential information processing task list is cached as a whole to the task cache queue, thus making it possible to prevent the information processing tasks in the sequential information processing task list from being concurrently verified and confirmed; and a measure capable of avoiding a conflict is adopted for an information processing task satisfying the predetermined conflict condition, thus making it possible to improve effectiveness of the information processing tasks in the decentralized data management system.

Preferably, the concurrency risk detection unit 602 is further configured to: obtain an execution result of executing each of the requested multiple information processing tasks, based on static code analysis performed on functions related to the information processing task in the decentralized data management system; determine a concurrency risk with respect to any pair of information processing tasks among the requested multiple information processing tasks based on the execution results; and sort the pair of information processing tasks based on the determined concurrency risk of each pair of information processing tasks, to generate the sequential information processing task list.

Preferably, the concurrency risk detection unit 602 is further configured to: obtain, by performing static code analysis on functions related to the information processing task in the decentralized data management system, a syntax tree of executing the functions related to the information processing task; and obtain, based on the syntax tree, an execution result of executing each requested information processing task.

Preferably, the concurrency risk detection unit 602 is further configured to: collect execution paths, conditions of execution paths and execution results of all paths of functions related to the information processing tasks according to the syntax tree; and with respect to each requested information processing task, obtain an execution result of executing each requested information processing task by performing mapping with the execution paths and the conditions of execution paths.

Preferably, the concurrency risk detection unit 602 is further configured to: compute a concurrency risk score, based on the characteristic and the type of write data in an execution result with respect to each information processing task in the pair of information processing tasks.

Thus, the apparatus 600 for managing effectiveness of an information processing task in a decentralized data management system according to the embodiment of the present disclosure can detect a concurrency risk of information processing tasks based on static code analysis before dynamically executing the information processing tasks on multiple execution subjects.

For specific examples of the above processing in the concurrency risk detection unit 602, reference may be made to the description in the corresponding portions in the above method embodiment in regard to for example the concurrency risk detection operation S102 and FIG. 4, and no repeated description will be made herein.

Preferably, the caching unit 604 is further configured to: sequentially cache concurrent information processing tasks having no concurrency risk to the task cache queue.

Preferably, the caching unit 604 is further configured to: with respect to each task among concurrent information processing tasks having no concurrency risk, cache a read set and a write set obtained by executing each task according to a processing rule in the decentralized data management system, in association with the information processing task, to the task cache queue; and with respect to the sequential information processing task list, only cache a read set and a write set obtained by executing an information processing task whose order is the first in the sequential information processing task list according to the processing rule, in association with the sequential information processing task list, to the task cache queue.

For specific examples of the above processing in the caching unit 604, reference may be made to the description in the corresponding portions in the above method embodiment in regard to for example the caching operation 104 and FIG. 5, and no repeated description will be made herein.

Preferably, the judging unit 606 is further configured to: determine that the one information processing task does not satisfy the predetermined conflict condition, if the one information processing task is not conflict with any information processing task included in a set of information processing tasks waiting to be confirmed; and determine that the one information processing task satisfies the predetermined conflict condition, if the one information processing task is conflict with any information processing task included in a set of information processing tasks waiting to be confirmed.

Preferably, the judging unit 606 is further configured to: determine that the one information processing task does not satisfy the predetermined conflict condition, if read data obtained by executing the one information processing task according to a processing rule in the decentralized data management system is not the same as write data obtained by executing any information processing task included in the set of information processing tasks waiting to be confirmed according to the processing rule; and determine that the one information processing task satisfies the predetermined conflict condition, if read data obtained by executing the one information processing task according to the processing rule in the decentralized data management system is the same as write data obtained by executing any information processing task included in the set of information processing tasks waiting to be confirmed according to the processing rule.

As can be seen from the above description, it is possible to determine, by performing a comparison on the read data obtained by executing the one information processing task and the write data obtained by executing any information one processing task included in the set of information processing tasks waiting to be confirmed, whether or not the predetermined conflict condition is satisfied.

For specific examples of the above processing in the judging unit 606, reference may be made to the description in the corresponding portions in the above method embodiment in regard to for example the judging operation S106 and FIG. 5, and no repeated description will be made herein.

Preferably, the conflict processing unit 608 is further configured to: with respect to each information processing task in the task cache queue, if it is determined that the information processing task does not satisfy the predetermined conflict condition, cause the information processing task to continue with subsequent processing.

Preferably, the conflict processing unit 608 is further configured to: while causing the information processing task in the task cache queue to continue with subsequent processing, update the set of information processing tasks waiting to be confirmed by adding the transmitted information processing tasks to the set of information processing tasks waiting to be confirmed.

Preferably, the conflict processing unit 608 is further configured to: after the information processing task continuing with subsequent information are verified and confirmed by multiple execution subjects, update the set of information processing tasks waiting to be confirmed by deleting the confirmed information processing task from the set of information processing tasks waiting to be confirmed, and delete information processing tasks conflict with the confirmed information processing task from the conflict task queue and cache the deleted tasks to the task cache queue.

Preferably, the conflict processing unit 608 is further configured such that: when subsequent processing is continued for one information processing task in the sequential information processing task list, all information processing tasks following the one information processing task in the sequential information processing task list wait without continuation with subsequent processing; and subsequent processing is not continued for the information processing task immediately following the one information processing task, until the one information processing task has been confirmed.

As such, it is possible to cause the information processing tasks in the sequential information processing task list not to be concurrently verified and confirmed, but to be sequentially verified and confirmed, thus making it possible to improve effectiveness of an information processing task in the decentralized data management system.

For specific examples of the above processing in the conflict processing unit 608, reference may be made to the description in the corresponding portions in the above method embodiment in regard to for example the conflict processing operation S108 and FIG. 5, and no repeated description will be made herein.

It should also be noted that, although the function configuration of the apparatus for managing effectiveness of an information processing task in a decentralized data management system according to the embodiment of the present disclosure has been described above, this is only exemplary but not limiting, and those skilled in the art can carry out modifications on the above embodiment according to the principle of the disclosure, for example can perform additions, deletions or combinations or the like on the respective functional modules in the embodiment. Moreover, all such modifications fall within the scope of the present disclosure.

In addition, it should also be noted that the apparatus embodiment herein corresponds to the above method embodiment. Thus for contents not described in detail in the apparatus embodiment, reference may be made to the description in the corresponding portions in the method embodiment, and no repeated description will be made herein.

In addition, the present disclosure further provides a storage medium and a program product. Machine executable instructions in the storage medium and the program product according to embodiments of the present disclosure can be configured to implement the above method for managing effectiveness of an information processing task in a decentralized data management system. Thus for contents not described in detail herein, reference may be made to the description in the preceding corresponding portions, and no repeated description will be made herein.

Accordingly, a storage medium for carrying the above program product comprising machine executable instructions is also included in the disclosure of the present invention. The storage medium includes but is not limited to a floppy disc, an optical disc, a magnetic optical disc, a memory card, a memory stick and the like.

Figure 7:
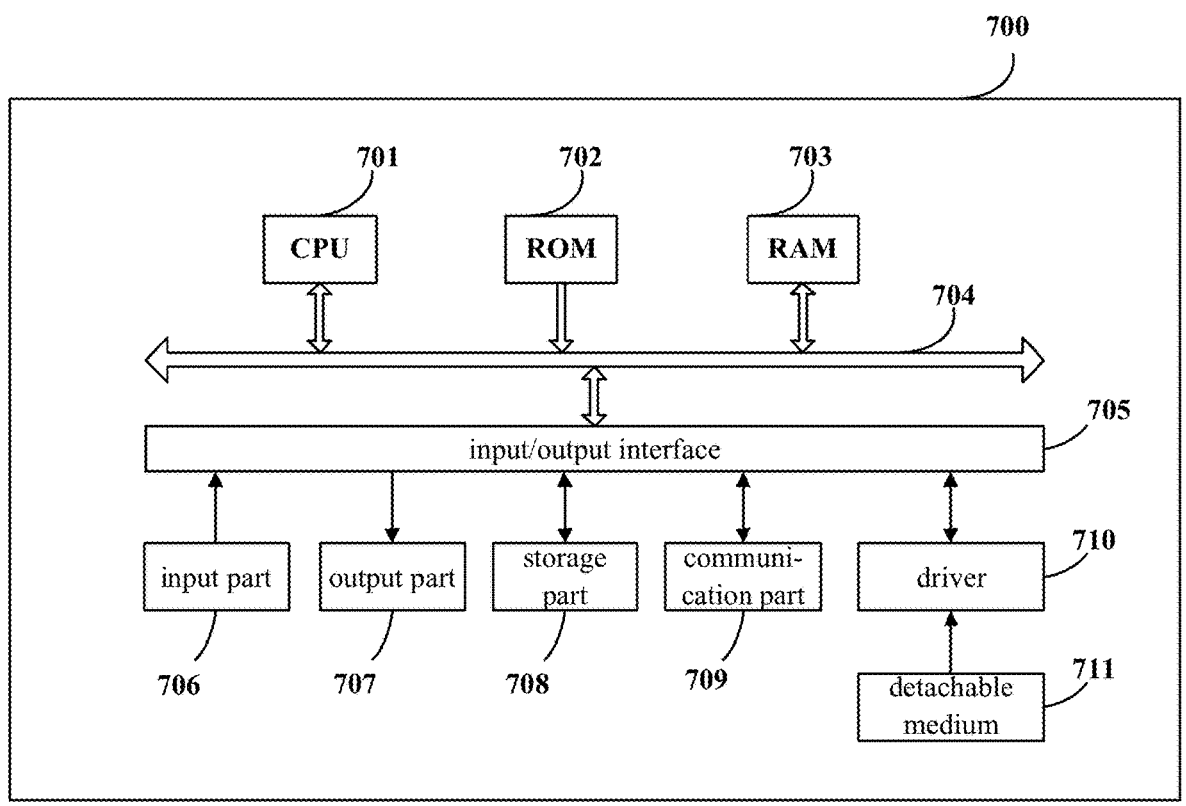
FIG. 7 is a block diagram showing an exemplary structure which is used as a personal computer usable in an embodiment of the present disclosure.

In addition, it should also be noted that, the foregoing series of processing and apparatuses can also be implemented by software and/or firmware. In the case of implementation by software and/or firmware, programs constituting the software are installed from a storage medium or a network to a computer having a dedicated hardware structure, for example the universal personal computer 700 as shown in FIG. 7. The computer, when installed with various programs, can execute various functions and the like.

In FIG. 7, a Central Processing Unit (CPU) 701 executes various processing according to programs stored in a Read-Only Memory (ROM) 702 or programs loaded from a storage part 708 to a Random Access Memory (RAM) 703. In the RAM 703, data needed when the CPU 701 executes various processing and the like is also stored, as needed.

The CPU 701, the ROM 702 and the RAM 703 are connected to each other via a bus 704. An input/output interface 705 is also connected to the bus 704.

The following components are connected to the input/output interface 705: an input part 706, including a keyboard, a mouse and the like; an output part 707, including a display, such as a Cathode Ray Tube (CRT), a Liquid Crystal Display (LCD) and the like, as well as a speaker and the like; the storage part 708, including a hard disc and the like; and a communication part 709, including a network interface card such as an LAN card, a modem and the like. The communication part 709 executes communication processing via a network such as the Internet.

As needed, a driver 710 is also connected to the input/output interface 705. A detachable medium 711 such as a magnetic disc, an optical disc, a magnetic optical disc, a semiconductor memory and the like is installed on the driver 710 as needed, such that computer programs read therefrom are installed in the storage part 708 as needed.

In a case where the foregoing series of processing is implemented by software, programs constituting the software are installed from a network such as the Internet or a storage medium such as the detachable medium 711.

Those skilled in the art should appreciate that, such a storage medium is not limited to the detachable medium 711 in which programs are stored and which are distributed separately from an apparatus to provide the programs to users as shown in FIG. 7. Examples of the detachable medium 711 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Or, the memory medium may be hard discs included in the ROM 702 and the memory part 708, in which programs are stored and which are distributed together with the apparatus containing them to users.

Preferred embodiments of the present disclosure have been described above with reference to the drawings. However, the present disclosure of course is not limited to the above examples. Those skilled in the art can obtain various alterations and modifications within the scope of the appended claims, and it should be understood that these alterations and modifications naturally will fall within the technical scope of the present disclosure.

For example, in the above embodiments, a plurality of functions incorporated in one unit can be implemented by separate devices. Alternatively, in the above embodiments, a plurality of functions implemented by a plurality of units can be implemented by separate devices, respectively. In addition, one of the above functions can be implemented by a plurality of units. Undoubtedly, such configuration is included within the technical scope of the present disclosure.

In the specification, the operations described in the flowcharts not only include processing executed in the order according to a time sequence, but also include processing executed in parallel or separately but not necessarily according to a time sequence. Moreover, even in the operations of the processing according to a time sequence, it is of course still possible to appropriately change the order.

In addition, the following configurations can also be performed according to the technology of the present disclosure.

Appendix 1. A method for managing effectiveness of an information processing task in a decentralized data management system, the decentralized data management system comprising a client and multiple execution subjects for executing an information processing task initiated by the client, the client and the multiple execution subjects holding same database copies respectively, wherein the respective database copies are updated based on results approved by both the client and the multiple execution subjects among execution results of the information processing task, the method comprising:

sending requests for multiple information processing tasks by the client to the multiple execution subjects, wherein information processing tasks in a sequential information processing task list comprising at least two information processing tasks in an order are transmitted to the multiple execution subjects in the order, the sequential information processing task list is generated by performing concurrency risk detection on the requested multiple information processing tasks;

caching the requested multiple information processing tasks to a task cache queue, wherein the sequential information processing task list is cached as a whole to the task cache queue;

judging whether or not each information processing task in the task cache queue satisfies a predetermined conflict condition; and with respect to each information processing task in the task cache queue, moving the information processing task to a conflict task queue if it is determined that the information processing task satisfies the predetermined conflict condition, deleting the information processing task from the conflict task queue and caching the information processing task to the task cache queue for continuing with subsequent processing when the predetermined conflict condition is not satisfied.

Appendix 2. The method according to Appendix 1, wherein generating the sequential information processing task list by performing concurrency risk detection on the requested multiple information processing tasks comprises:

obtaining an execution result of executing each of the requested multiple information processing tasks, based on static code analysis performed on functions related to the information processing task in the decentralized data management system;

determining a concurrency risk with respect to any pair of information processing tasks among the requested multiple information processing tasks based on the execution results; and sorting the pair of information processing tasks based on the determined concurrency risk of each pair of information processing tasks, to generate the sequential information processing task list.

Appendix 3. The method according to Appendix 2, wherein determining a concurrency risk with respect to any pair of information processing tasks based on the execution result comprises:

computing a concurrency risk score, based on the characteristic and the type of write data in an execution result with respect to each information processing task in the pair of information processing tasks.

Appendix 4. The method according to Appendix 2, wherein obtaining an execution result of each of the requested multiple information processing tasks comprises:

obtaining, by performing static code analysis on functions related to the information processing task in the decentralized data management system, a syntax tree of executing the functions related to the information processing task; and obtaining, based on the syntax tree, an execution result of executing each requested information processing task.

Appendix 5. The method according to Appendix 4, wherein obtaining, based on the syntax tree, an execution result of executing each requested information processing task, comprises:

collecting execution paths, conditions of execution paths and execution results of all paths of functions related to the information processing tasks according to the syntax tree; and with respect to each requested information processing task, obtaining an execution result of executing each requested information processing task by performing mapping with the execution paths and the conditions of execution paths.

Appendix 6. The method according to Appendix 1, wherein judging whether or not one information processing task in the task cache queue satisfies a predetermined conflict condition comprises:

determining that the one information processing task does not satisfy the predetermined conflict condition, if the one information processing task is not conflict with any one information processing task included in a set of information processing tasks waiting to be confirmed; and determining that the one information processing task satisfies the predetermined conflict condition, if the one information processing task is conflict with any one information processing task included in a set of information processing tasks waiting to be confirmed.

Appendix 7. The method according to Appendix 6, wherein judging whether or not one information processing task in the task cache queue satisfies a predetermined conflict condition further comprises:

determining that the one information processing task does not satisfy the predetermined conflict condition, if read data obtained by executing the one information processing task according to a processing rule in the decentralized data management system is not the same as write data obtained by executing any one information processing task included in the set of information processing tasks waiting to be confirmed according to the processing rule; and determining that the one information processing task satisfies the predetermined conflict condition, if read data obtained by executing the one information processing task according to the processing rule is the same as write data obtained by executing any one information processing task included in the set of information processing tasks waiting to be confirmed according to the processing rule.

Appendix 8. The method according to Appendix 1, wherein when subsequent processing is continued for one information processing task in the sequential information processing task list, all information processing tasks following the one information processing task in the sequential information processing task list wait without continuation with subsequent processing; and subsequent processing is not continued for the information processing task immediately following the one information processing task, until the one information processing task has been confirmed.

Appendix 9. The method according to Appendix 1, wherein caching the requested multiple information processing tasks to the task cache queue comprises:

sequentially caching information processing tasks having no concurrency risk to the task cache queue.

Appendix 10. The method according to Appendix 1, wherein caching the requested multiple information processing tasks to the task cache queue comprises:

with respect to each task among concurrent information processing tasks having no concurrency risk, caching a read set and a write set obtained by executing each task according to a processing rule in the decentralized data management system, in association with the information processing task, to the task cache queue; and with respect to the sequential information processing task list, only caching a read set and a write set obtained by executing an information processing task whose order is the first in the sequential information processing task list according to the processing rule, in association with the sequential information processing task list, to the task cache queue Appendix 11. The method according to Appendix 1, wherein with respect to each information processing task in the task cache queue, if it is determined that the information processing task does not satisfy the predetermined conflict condition, the information processing task is caused to continue with subsequent processing.

Appendix 12. The method according to Appendix 6, wherein while causing the information processing task in the task cache queue to continue with subsequent processing, the set of information processing tasks waiting to be confirmed is updated by adding the transmitted information processing tasks to the set of information processing tasks waiting to be confirmed.

Appendix 13. The method according to Appendix 12, wherein after the information processing task continuing with subsequent information is verified and confirmed by multiple execution subjects, the set of information processing tasks waiting to be confirmed is updated by deleting the confirmed information processing task from the set of information processing tasks waiting to be confirmed, and information processing tasks conflict with the confirmed information processing task are deleted from the conflict task queue and the deleted tasks are cached to the task cache queue.

Appendix 14. An apparatus for managing effectiveness of an information processing task in a decentralized data management system, the decentralized data management system comprising a client and multiple execution subjects for executing an information processing task initiated by the client, the client and the multiple execution subjects holding same database copies respectively, wherein the respective database copies are updated based on results approved by both the client and the multiple execution subjects among execution results of the information processing task, the apparatus comprising:

a concurrency risk detection unit configured to send requests for multiple information processing tasks at the client to the multiple execution subjects, wherein information processing tasks in a sequential information processing task list comprising at least two information processing tasks in an order are transmitted to the multiple execution subjects in the order, the sequential information processing task list is generated by performing concurrency risk detection on the requested multiple information processing tasks;

a caching unit configured to cache the requested multiple information processing tasks to a task cache queue, wherein the sequential information processing task list is cached as a whole to the task cache queue;

a judgment unit configured to judge whether or not each information processing task in the task cache queue satisfies a predetermined conflict condition; and a conflict processing unit configured to, with respect to each information processing task in the task cache queue, move the information processing task to a conflict task queue if it is determined that the information processing task satisfies the predetermined conflict condition, delete the information processing task from the conflict task queue and cache the information processing task to the task cache queue for continuing with subsequent processing when the predetermined conflict condition is not satisfied.

Appendix 15. The apparatus according to Appendix 14, wherein the concurrency risk detection unit is further configured to:

obtain an execution result of executing each of the requested multiple information processing tasks, based on static code analysis performed on functions related to the information processing task in the decentralized data management system;

determine a concurrency risk with respect to any pair of information processing tasks among the requested multiple information processing tasks based on the execution result; and sort the pair of information processing tasks based on the determined concurrency risk of each pair of information processing tasks, to generate the sequential information processing task list.

Appendix 16. The apparatus according to Appendix 15, wherein the concurrency risk detection unit is further configured to:

compute a concurrency risk score, based on the characteristic and the type of write data in an execution result with respect to each information processing task in the pair of information processing tasks.

Appendix 17. The apparatus according to Appendix 15, wherein the concurrency risk detection unit is further configured to:

obtain, by performing static code analysis on functions related to the information processing task in the decentralized data management system, a syntax tree of executing the functions related to the information processing task; and obtain, based on the syntax tree, an execution result of executing each requested information processing task.

Appendix 18. The apparatus according to Appendix 14, wherein the judging unit is further configured to:

determine that one information processing task does not satisfy the predetermined conflict condition, if the one information processing task is not conflict with any one information processing task included in a set of information processing tasks waiting to be confirmed; and determine that the one information processing task satisfies the predetermined conflict condition, if the one information processing task is conflict with any one information processing task included in a set of information processing tasks waiting to be confirmed.

Appendix 19. The apparatus according to Appendix 14, wherein when subsequent processing is continued for one information processing task in the sequential information processing task list, all information processing tasks following the one information processing task in the sequential information processing task list wait without continuation with subsequent processing; and subsequent processing is not continued for the information processing task immediately following the one information processing task, until the one information processing task has been confirmed.

Appendix 20. A computer readable storage medium having recorded thereon a computer program that, when executed, is used for implementing a method for managing effectiveness of an information processing task in a decentralized data management system, the decentralized data management system comprising a client and multiple execution subjects for executing an information processing task initiated by the client, the client and the multiple execution subjects holding same database copies respectively, wherein the respective database copies are updated based on results approved by both the client and the multiple execution subjects among execution results of the information processing task, the method comprising:

sending requests for multiple information processing tasks by the client to the multiple execution subjects, wherein information processing tasks in a sequential information processing task list comprising at least two information processing tasks in an order are transmitted to the multiple execution subjects in the order, the sequential information processing task list is generated by performing concurrency risk detection on the requested multiple information processing tasks;

caching the requested multiple information processing tasks to a task cache queue, wherein the sequential information processing task list is cached as a whole to the task cache queue;

judging whether or not each information processing task in the task cache queue satisfies a predetermined conflict condition; and with respect to each information processing task in the task cache queue, moving the information processing task to a conflict task queue if it is determined that the information processing task satisfies the predetermined conflict condition, deleting the information processing task from the conflict task queue and caching the information processing task to the task cache queue for continuing with subsequent processing when the predetermined conflict condition is not satisfied.

What is claimed is:

1. A method of managing effectiveness of an information processing task in a decentralized data management system that includes a client and multiple execution subjects, the method comprising:

sending requests for multiple information processing tasks initiated by the client to the multiple execution subjects, the client and the multiple execution subjects holding same database copies respectively and the respective database copies being updated based on results approved by both the client and the multiple execution subjects, wherein among the multiple information processing tasks, information processing tasks in a sequential information processing task list including at least two information processing tasks in an order are sent to the multiple execution subjects in the order, and the sequential information processing task list is generated by performing a concurrency risk detection on the requested multiple information processing tasks;

caching the requested multiple information processing tasks to a task cache queue, wherein the sequential information processing task list is cached as a whole to the task cache queue;

judging whether a respective information processing task in the task cache queue satisfies a predetermined conflict condition; and with respect to the respective information processing task in the task cache queue, moving the respective information processing task to a conflict task queue upon determining that the respective information processing task satisfies the predetermined conflict condition, deleting the respective information processing task from the conflict task queue, and caching the respective information processing task to the task cache queue for continuing with subsequent processing upon determining the predetermined conflict condition is unsatisfied.

2. The method according to claim 1, wherein the sequential information processing task list is generated by:

obtaining an execution result of executing each of the requested multiple information processing tasks, based on a static code analysis performed on functions related to the respective information processing task in the decentralized data management system;

determining a concurrency risk with respect to any pair of the information processing tasks among the requested multiple information processing tasks based on the execution results; and sorting the pair of the information processing tasks based on the determined concurrency risk of each pair of the information processing tasks, to generate the sequential information processing task list.

3. The method according to claim 2, wherein the determining of the concurrency risk comprises:

computing a concurrency risk score, based on a characteristic and a type of write data in the execution result with respect to each information processing task in the pair of information processing tasks.

4. The method according to claim 2, wherein the obtaining of the execution result of each of the requested multiple information processing tasks comprises:

obtaining, by performing the static code analysis on functions related to the respective information processing task in the decentralized data management system, a syntax tree of executing the functions related to the respective information processing task; and obtaining, based on the syntax tree, the execution result of executing each requested information processing task.

5. The method according to claim 4, wherein the obtaining, based on the syntax tree, the execution result of executing each requested information processing task, comprises:

collecting execution paths, conditions of the execution paths and execution results of all paths of functions related to the multiple information processing tasks according to the syntax tree; and with the respect to each of the requested information processing task, obtaining the execution result of the executing of each of the requested information processing task by performing mapping with the execution paths and the conditions of execution paths.

6. The method according to claim 1, wherein the judging of whether the respective information processing task in the task cache queue satisfies the predetermined conflict condition comprises:

determining the predetermined conflict condition is unsatisfied provided no conflict exists between one information processing task and the any one other information processing task included in a set of information processing tasks waiting to be confirmed; and determining the predetermined conflict condition is satisfied provided a conflict exists between the one information processing task and the any one other information processing task included in the set of information processing tasks waiting to be confirmed.

7. The method according to claim 6, wherein the judging of whether the respective information processing task in the task cache queue satisfies the predetermined conflict condition further comprises:

determining the predetermined conflict condition is unsatisfied, provided read data obtained by executing the respective information processing task according to a processing rule in the decentralized data management system is not the same as the write data obtained by executing the any one information processing task included in the set of information processing tasks waiting to be confirmed according to the processing rule; and determining the predetermined conflict condition is satisfied, provided the read data obtained by executing the respective information processing task according to the processing rule is the same as write data obtained by executing any one information processing task included in the set of information processing tasks waiting to be confirmed according to the processing rule.

8. The method according to claim 1, wherein when subsequent processing is continued for one information processing task in the sequential information processing task list, all information processing tasks following the one information processing task in the sequential information processing task list wait without continuation with subsequent processing; and the subsequent processing is not continued for the information processing task immediately following the one information processing task, until the one information processing task has been confirmed.

9. The method according to claim 1, wherein the caching the respective information processing task to the task cache queue comprises:

sequentially caching the information processing tasks having no concurrency risk to the task cache queue.

10. The method according to claim 1, wherein the caching the respective information processing task to the task cache queue comprises:

with respect to each task among concurrent the information processing tasks having no concurrency risk, caching a read set and a write set obtained by executing each task according to a processing rule in the decentralized data management system, in association with the respective information processing task, to the task cache queue; and with respect to the sequential information processing task list, only caching the read set and the write set obtained by executing an information processing task whose order is the first in the sequential information processing task list according to the processing rule, in association with the sequential information processing task list, to the task cache queue.

11. The method according to claim 1, wherein with respect to each of the information processing task in the task cache queue, upon determining that the predetermined conflict condition is unsatisfied with respect to the information processing task, the information processing task is caused to continue with the subsequent processing.

12. The method according to claim 6, wherein while causing the information processing task in the task cache queue to continue with subsequent processing, the set of information processing tasks waiting to be confirmed is updated by adding the information processing tasks to the set of information processing tasks waiting to be confirmed.

13. The method according to claim 12, wherein after the information processing task continuing with the subsequent information is verified and confirmed by the multiple execution subjects, the set of information processing tasks waiting to be confirmed is updated by deleting the confirmed information processing task from the set of information processing tasks waiting to be confirmed, and the information processing tasks conflict with the confirmed information processing task are deleted from the conflict task queue and the deleted tasks are cached to the task cache queue.

14. An apparatus of managing effectiveness of an information processing task in a decentralized data management system that includes a client and multiple execution subjects, the apparatus comprising:

a memory to store instructions; and one or more processors coupled to the memory, the one or more processors configured to:

send requests for multiple information processing tasks initiated at the client to the multiple execution subjects, the client and the multiple execution subjects holding same database copies respectively and the respective database copies being updated based on results approved by both the client and the multiple execution subjects, wherein among the multiple information processing tasks, information processing tasks in a sequential information processing task list including at least two information processing tasks in an order are sent to the multiple execution subjects in the order, and the sequential information processing task list is generated by performing a concurrency risk detection on the requested multiple information processing tasks;

cache the requested multiple information processing tasks to a task cache queue, wherein the sequential information processing task list is cached as a whole to the task cache queue;

judge whether a respective information processing task in the task cache queue satisfies a predetermined conflict condition; and with respect to the respective information processing task in the task cache queue, move the respective information processing task to a conflict task queue upon determining that the respective information processing task satisfies the predetermined conflict condition, delete the respective information processing task from the conflict task queue, and cache the respective information processing task to the task cache queue for continuing with subsequent processing upon determining the predetermined conflict condition is unsatisfied.

15. The apparatus according to claim 14, wherein the one or more processors is further configured to:

obtain an execution result of executing each of the requested multiple information processing tasks, based on a static code analysis performed on functions related to the respective information processing task in the decentralized data management system;

determine a concurrency risk with respect to any pair of information processing tasks among the requested multiple information processing tasks based on the execution results; and sort the pair of information processing tasks based on the determined concurrency risk of each pair of the information processing tasks, to generate the sequential information processing task list.

16. The apparatus according to claim 15, wherein the one or more processors is further configured to:

compute a concurrency risk score, based on a characteristic and a type of write data in an execution result with respect to each of the information processing task in the pair of the information processing tasks.

17. The apparatus according to claim 15, wherein the one or more processors is further configured to:
  obtain, by performing the static code analysis on functions related to the respective information processing task in the decentralized data management system, a syntax tree of executing the functions related to the respective information processing task; and
  obtain, based on the syntax tree, the execution result of executing each requested information processing task.

18. The apparatus according to claim 14, wherein the one or more processors is further configured to:
  determine the predetermined conflict condition is unsatisfied, provided no conflict exists between one information processing and the any one other information processing task included in a set of information processing tasks waiting to be confirmed; and
  determine the predetermined conflict condition is satisfied provided a conflict exists between the one information processing task and the any other one information processing task included in the set of information processing tasks waiting to be confirmed.

19. The apparatus according to claim 14, wherein
  when the subsequent processing is continued for one information processing task in the sequential information processing task list, all information processing tasks following the one information processing task in the sequential information processing task list wait without continuation with the subsequent processing; and
  subsequent processing is not continued for an information processing task immediately following the one information processing task, until the one information processing task has been confirmed.

20. A nonvolatile computer readable storage medium having recorded thereon a computer program that, when executed, is used for implementing a method of managing effectiveness of an information processing task in a decentralized data management system that includes a client and multiple execution subjects, the method comprising:
  sending requests for multiple information processing tasks initiated by the client to the multiple execution subjects, the client and the multiple execution subjects holding same database copies respectively and the respective database copies being updated based on results approved by both the client and the multiple execution subjects, wherein among the multiple information processing tasks, information processing tasks in a sequential information processing task list including at least two information processing tasks in an order are sent to the multiple execution subjects in the order, and the sequential information processing task list is generated by performing a concurrency risk detection on the requested multiple information processing tasks;
  caching the requested multiple information processing tasks to a task cache queue, wherein the sequential information processing task list is cached as a whole to the task cache queue;
  judging whether a respective information processing task in the task cache queue satisfies a predetermined conflict condition; and
  with respect to the respective information processing task in the task cache queue,
    moving the respective information processing task to a conflict task queue upon determining that the information processing task satisfies the predetermined conflict condition,
    deleting the respective information processing task from the conflict task queue, and
    caching the respective information processing task to the task cache queue for continuing with subsequent processing upon determining the predetermined conflict condition is unsatisfied.

* * * * *